US006842849B2

(12) United States Patent
Hinds et al.

(10) Patent No.: US 6,842,849 B2
(45) Date of Patent: Jan. 11, 2005

(54) LOCKING SOURCE REGISTERS IN A DATA PROCESSING APPARATUS

(75) Inventors: Christopher Neal Hinds, Austin, TX (US); Morgan Lee Reece, Pflugerville, TX (US)

(73) Assignee: ARM Limited, Cambridge (GB)

( * ) Notice: Subject to any disclaimer, the term of this patent is extended or adjusted under 35 U.S.C. 154(b) by 606 days.

(21) Appl. No.: 09/860,777

(22) Filed: May 21, 2001

(65) Prior Publication Data

US 2003/0033506 A1 Feb. 13, 2003

(51) Int. Cl.$^7$ ................................................. G06F 9/38
(52) U.S. Cl. ........................................................ 712/217
(58) Field of Search ........................................ 712/217

(56) References Cited

U.S. PATENT DOCUMENTS

| 5,749,095 | A | * | 5/1998 | Hagersten | 711/141 |
| 5,787,465 | A | * | 7/1998 | Jouppi et al. | 711/117 |
| 6,304,963 | B1 | * | 10/2001 | Elwood | 712/244 |
| 6,675,292 | B2 | * | 1/2004 | Prabhu et al. | 712/244 |

FOREIGN PATENT DOCUMENTS

| EP | 0 959 402 | 11/1999 |
| EP | 1 093 053 | 4/2001 |
| GB | 2 339 312 | 1/2000 |
| GB | 2 339 623 | 2/2000 |

* cited by examiner

*Primary Examiner*—Eric Coleman
(74) *Attorney, Agent, or Firm*—Nixon & Vanderhye P.C.

(57) ABSTRACT

The present invention provides a system and method for locking source registers in a data processing apparatus. The data processing apparatus comprises a processing unit having a pipeline for executing a sequence of instructions, and a set of source registers for storing source data required by the processing unit when executing instructions in the sequence. A locking mechanism is then used to lock source registers dependent on configurable criteria, the configurable criteria being chosen to ensure that source registers still required for completing execution of an instruction in the pipeline are locked to prevent predetermined types of access by a subsequent instruction, the subsequent instruction only being able to enter the pipeline if the source registers relevant to that instruction can be accessed as required by the instruction. In accordance with the present invention, the processing unit has a first and second mode of operation. In the first mode of operation, the processing unit is arranged, upon determination of one or more exception conditions during execution of an instruction, to invoke a process external to the pipelined execution unit to enable execution of the instruction to be completed. In contrast, in the second mode of operation, the processing unit is arranged to complete execution of an instruction within the pipeline even if the presence of the one or more exception conditions is determined. A locking mechanism is then arranged to alter the configurable criteria dependent upon the mode of operation of the processing unit, such that a reduction in the number of source registers being locked can be achieved in the second mode of operation. This then enables the processing speed of the processing unit to be significantly improved when running in the second mode of operation.

16 Claims, 14 Drawing Sheets

| FCDP1 S0,S1,S2 | | | | | | | | | | |
|---|---|---|---|---|---|---|---|---|---|---|
| FCDP2 S1,S3,S4 | | | | | | | | | | |
| CYCLE | 1 | 2 | 3 | 4 | 5 | 6 | 7 | 8 | 9 | 10 |
| FCDP1 | F | I | D | E1 | E2 | E3 | E4 | | | |
| FCDP2 | | F | I | I | D | E1 | E2 | E3 | E4 | |

FIG. 5A

| FCDP1 S0,S1,S2 | | | | | | | | | | |
|---|---|---|---|---|---|---|---|---|---|---|
| FCDP2 S1,S3,S4 | | | | | | | | | | |
| CYCLE | 1 | 2 | 3 | 4 | 5 | 6 | 7 | 8 | 9 | 10 |
| FCDP1 | F | I | D | E1 | E2 | E3 | E4 | | | |
| FCDP2 | | F | I | D | E1 | E2 | E3 | E4 | | |

FIG. 5B

FCDP S0,S1,S2
FLDS S1,[Rx]

| CYCLE | 1 | 2 | 3 | 4 | 5 | 6 | 7 | 8 |
|---|---|---|---|---|---|---|---|---|
| FCDP | F | I | D | E1 | E2 | E3 | E4 | W |
| FLDS |   | F | I | D | E | E | M |   |

FIG. 6A

FCDP S0,S1,S2
FLDS S1,[Rx]

| CYCLE | 1 | 2 | 3 | 4 | 5 | 6 | 7 | 8 |
|---|---|---|---|---|---|---|---|---|
| FCDP | F | I | D | E1 | E2 | E3 | E4 |   |
| FLDS |   | F | I | D | E | M | W |   |

FIG. 6B

FCDP S8,S16,S24
FLDMS {Rx}, {S24-S27}

| CYCLE | 1 | 2 | 3 | 4 | 5 | 6 | 7 | 8 | 9 | 10 | 11 |
|---|---|---|---|---|---|---|---|---|---|---|---|
| FCDP | F | | | | | | | | | | |
| ITERATION 1 | | | D | E1 | E2 | E3 | E4 | | | | |
| ITERATION 2 | | | | D | E1 | E2 | E3 | E4 | | | |
| ITERATION 3 | | | | | D | E1 | E2 | E3 | E4 | | |
| ITERATION 4 | | | | | | D | E1 | E2 | E3 | E4 | |
| | | I | | D | E | M | W | | | | |
| FLDMS | | F | I | D | E | M | W | | | | |

FIG. 7B

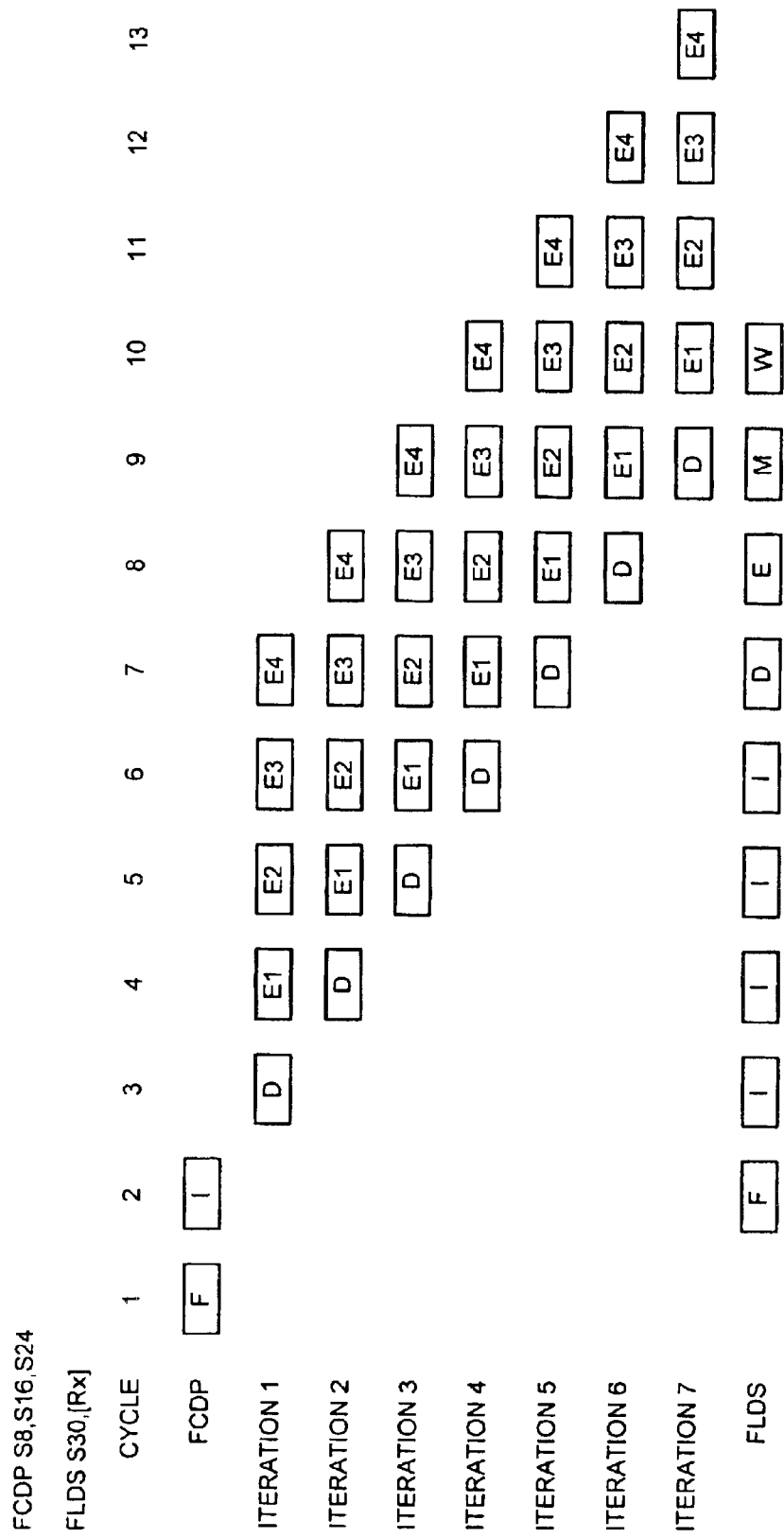

| SPECIFIED NUMBER OF ITERATIONS \ ITERATION SOURCE REGISTERS | ITERATION SOURCE REGISTERS LOCKED IN THE ISSUE STAGE | | | | | | | | CYCLE IN WHICH SOURCE REGISTERS ARE CLEARED FOR ITERATION "X" | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| 1 | X | | | | | | | | 4 | | | | | | | |
| 2 | X | X | | | | | | | 4 | 5 | | | | | | |
| 3 | X | X | X | | | | | | 4 | 5 | 6 | | | | | |
| 4 | X | X | X | X | | | | | 4 | 5 | 6 | 7 | | | | |
| 5 | X | X | X | X | X | | | | 4 | 5 | 6 | 7 | 8 | | | |
| 6 | X | X | X | X | X | X | | | 4 | 5 | 6 | 7 | 8 | 9 | | |
| 7 | X | X | X | X | X | X | X | | 4 | 5 | 6 | 7 | 8 | 9 | 10 | |
| 8 | X | X | X | X | X | X | X | X | 4 | 5 | 6 | 7 | 8 | 9 | 10 | 11 |

FIG. 9A

| ITERATION SOURCE REGISTERS | ITERATION SOURCE REGISTERS LOCKED IN THE ISSUE STAGE | | | | | | | | CYCLE IN WHICH SOURCE REGISTERS FOR ITERATION "X" ARE CLEARED | | | | | | | |
|---|---|---|---|---|---|---|---|---|---|---|---|---|---|---|---|---|
| SPECIFIED NUMBER OF ITERATIONS | 1 | 2 | 3 | 4 | 5 | 6 | 7 | 8 | 1 | 2 | 3 | 4 | 5 | 6 | 7 | 8 |
| 1 | | | | | | | | | | | | | | 7 | | 8 |
| 2 | | | | | | | | | | | | | | | | |
| 3 | | | | | | | | | | | | | | | | |
| 4 | | | | | | | | | | | | | | | | |
| 5 | | | | | X | | | | | | | | 4 | | | |
| 6 | | | | | X | X | | | | | | | 4 | 5 | | |
| 7 | | | | | X | X | X | | | | | | 4 | 5 | 6 | |
| 8 | | | | | X | X | X | X | | | | | 4 | 5 | 6 | 7 |

FIG. 9B

| SPECIFIED NUMBER OF ITERATIONS \ ITERATION SOURCE REGISTERS | ITERATION SOURCE REGISTERS LOCKED IN THE ISSUE STAGE | | | | CYCLE IN WHICH SOURCE REGISTERS FOR ITERATION "X" ARE CLEARED | | | |
|---|---|---|---|---|---|---|---|---|
| | 1 | 2 | 3 | 4 | 1 | 2 | 3 | 4 |
| 1 | X | | | | 4 | | | |
| 2 | X | X | | | 4 | 5 | | |
| 3 | X | X | X | | 4 | 5 | 6 | |
| 4 | X | X | X | X | 4 | 5 | 6 | 7 |

FIG. 9C

| SPECIFIED NUMBER OF ITERATIONS \ ITERATION SOURCE REGISTERS | ITERATION SOURCE REGISTERS LOCKED IN THE ISSUE STAGE | | | | CYCLE IN WHICH SOURCE REGISTERS FOR ITERATION "X" ARE CLEARED | | | |
|---|---|---|---|---|---|---|---|---|
| | 1 | 2 | 3 | 4 | 1 | 2 | 3 | 4 |
| 1 | X | | | | 4 | | | |
| 2 | X | X | | | 4 | 6 | | |
| 3 | X | X | X | | 4 | 6 | 8 | |
| 4 | X | X | X | X | 4 | 6 | 8 | 10 |

FIG. 9D

| | ITERATION SOURCE REGISTERS LOCKED IN THE ISSUE STAGE | | | | CYCLE IN WHICH SOURCE REGISTERS FOR ITERATION "X" ARE CLEARED | | | |
|---|---|---|---|---|---|---|---|---|
| ITERATION SOURCE REGISTERS / SPECIFIED NUMBER OF ITERATIONS | 1 | 2 | 3 | 4 | 1 | 2 | 3 | 4 |
| 1 | | | | | | | | |
| 2 | | | | | | | | |
| 3 | | | X | | | | 4 | |
| 4 | | | X | X | | | 4 | 5 |

FIG. 9E

| | ITERATION SOURCE REGISTERS LOCKED IN THE ISSUE STAGE | | | | CYCLE IN WHICH SOURCE REGISTERS FOR ITERATION "X" ARE CLEARED | | | |
|---|---|---|---|---|---|---|---|---|
| ITERATION SOURCE REGISTERS / SPECIFIED NUMBER OF ITERATIONS | 1 | 2 | 3 | 4 | 1 | 2 | 3 | 4 |
| 1 | | | | | | | | |
| 2 | | | | | | | | |
| 3 | | | X | | | | 4 | |
| 4 | | | X | X | | | 4 | 6 |

FIG. 9F

LOCKING SOURCE REGISTERS IN A DATA PROCESSING APPARATUS

BACKGROUND OF THE INVENTION

1. Field of the Invention

The present invention relates to the locking of source registers in a data processing apparatus.

2. Description of the Prior Art

It is known to provide processors that incorporate one or more pipelines for executing instructions. Due to the pipeline nature of such processors, multiple instructions may be in the process of being executed at any point in time, and this has given rise to the need to provide appropriate hazard and resource checking functions for the pipelined processor. Hence, each instruction is typically evaluated prior to issuing it to the execution pipeline to determine whether a hazard condition or a resource conflict would arise if it were to be issued to the execution pipeline. A hazard condition will be detected if that instruction requires a data item that is not yet available due to it still being computed (for example by an instruction already being executed in the pipeline), or if that instruction requires access to a register which is still required by another instruction already in the pipeline, and which must not be overwritten until it is read by that instruction already in the pipeline. A resource conflict will be detected if there is a requirement for a processing unit, which is not available due to it already being used for another executing instruction.

It is possible to perform no hazard or resource checking, and instead to leave the job of avoiding hazard conditions and resource conflicts to the compiler/code writer. However, this typically results in very complex code, and accordingly it is common place for such hazard and resource checking procedures to be implemented.

The hazard and resource checking functions require the ability to stall the relevant processor and all dependent processors. For example, a coprocessor which detects a hazard condition must signal the detection of that hazard condition to the main processor, and the main processor will in most cases stall in order to maintain instruction flow coordination with the coprocessor. Similarly, a main processor detecting a hazard condition or a resource conflict may need to advise all coprocessors to stall their pipelines accordingly. It will be appreciated that stalling introduces uncertainty into the determination of the time to run a section of code.

Known processors utilise a variety of complex methods to detect hazard conditions and resource conflicts, and to reduce the impact on performance of such hazard conditions and resource conflicts. Register renaming is one such technique which may be used, this technique involving the utilisation of additional registers to remove hazard conditions relating to the writing of a register involved as a source register for an instruction already being executed. In high performance processors, instructions may be issued out of program order, enabling instructions which have no hazard or resource conflicts to execute ahead of instructions with hazard or resource conflicts. A typical technique used with such an approach is to maintain tables of instructions currently in some state of execution, and then, for a particular instruction, to make a determination as to the availability of the functional unit to process the instruction, and the availability of the operands required by the instruction. This may be accomplished in a distributed method by using, for instance, reservation stations, or in a centralised manner using, for instance, a reorder buffer technique.

Both of the above techniques are well known in the industry. As will be appreciated by those skilled in the art, the cost of such techniques, in terms of area and power, and in complexity, is relatively high.

Another known techniques which avoids much of the cost and complexity of the above described techniques involves the use of a scoreboard. A scoreboard tracks the availability of registers, either as source operands or as destinations for store operations. The scoreboard may be separated into separate parts, one for source operands, and one for destination operands, or a single scoreboard may be maintained for both source and destination operands. An entry in the scoreboard is then cleared when the register associated with that entry is available for use by a subsequent instruction. Hence, instructions to be issued to the execution pipeline which will require registers which are shown as locked in the scoreboard are forced to wait, or stall, until the registers become available. Scoreboards are typically simpler and cheaper, in terms of area, power and development costs, than the earlier described techniques, but typically offer lower performance.

Accordingly, the application area for the data processing apparatus typically dictates which of the above approaches are used. For high performance applications, such as desktop computing or scientific or business computing, the more complex techniques are often required to deliver the necessary performance. Machines such as the CDC6600, IBM360/91, and recent IBM, Intel x86 and Sun SPARC processors utilise these more complex techniques. However, for embedded applications the performance is typically not as critical, but instead the chip area of the processor and the power consumed are of greater importance, with the performance merely needing to be sufficient to meet the goal of the application. In such cases, the use of in-program-order instruction issue and the above described scoreboarding technique is typically the most appropriate technique for checking hazard conditions, whilst employing a limited number of pipelines, typically one or two, assists in reducing the complexity of resource management.

In many applications, the arithmetic performed may be characterised in such a manner that the range of operands and results is well known. However, when this is not possible, the arithmetic must be able to process, in a consistent and reasonable manner, conditions in which the result of an operation is outside the bounds of the range of the data type supported, or the operation involves operands for which a result is not defined (for instance, an addition of a positive infinity to a negative infinity).

Considering the example of floating-point arithmetic, the "IEEE Standard for Binary Floating-Point Arithmetic", ANSI/IEEE Std 754-1985, The Institute of Electrical and Electronic Engineers, Inc., New York, 10017 (hereafter referred to as the IEEE 754 standard) specifies the behaviour of instructions when the results are outside the range of the data type supported, or when the result of the operation is not defined. In order to fully implement the IEEE 754 specification, covering all the possible cases which the arithmetic may require, results in additional hardware/area and power consumption, and/or reduced clock speed. The IEEE 754 specification defines a number or exceptions, such exceptions being cases in which the result is not what would be returned if the arithmetic were performed with unlimited precision, or if the result is not defined. Five types of exception are defined in the IEEE 754 specification, namely invalid, overflow, underflow, divide-by-zero, and inexact.

In most embedded applications, the arithmetic may be characterised as well known, and the full features of the IEEE 754 specification are not typically required. For example, features such as subnormal support, and support for NaN (Not-a-Number) processing may not be required. However, the ability to process overflow conditions, and operations involving infinities, is generally advantageous.

When such exceptions are detected during execution of an instruction within the pipelined processor, then exception handling mechanisms are often invoked to handle those exceptions. Such exception handling mechanisms, when invoked, may need access to the source operands for the exceptional instruction in order to deal with the exception. Accordingly, when locking registers to avoid hazard conditions, such as is done when using the earlier described scoreboard technique, it is in such cases necessary to lock those source registers until the instruction has passed the point in the execution pipeline at which the exception will be detected.

In one prior art processor, described in more detail in GB-A-2,339,312, the processor is arranged to detect and process some of the exceptional cases pessimistically, meaning that a determination of the presence of an exception condition is based on the information available before the instruction is processed completely. In order to ensure that all possible exception cases are processed, some cases which may not result in an exceptional condition are treated as such until the operation is processed completely and a final determination made. In the processor described in GB-A-2,339,312, the detection is done in the first execute stage of the processor pipeline in order to minimise the amount of information required to save the current state of the processor to a minimum. Since detection of the exception is done without completion of the instruction, the source operands are required to be preserved for the exception handling mechanism, and cannot be unlocked in the scoreboard until the associated instruction passes the exception detection point (here the execute 1 stage of the pipeline). A software routine is then utilised to determine the exact disposition of the instruction, generate the correct answer, including special handling for IEEE 754 exception cases, and either return to the program or execute a user-defined exception handler.

Hence, in summary, the software routine used for exception handling requires access to the source registers of the instruction. Further, it will not execute until some number of cycles after the exceptional instruction. Accordingly, an instruction which may need to access the exceptional instruction's source registers may be issued between the execution of the exceptional instruction and the execution of the software routine to deal with the identified exception condition.

Thus, any instruction which needs to access the source registers of an executing instruction, in order to read them as operands, store them to memory, or load them with a new value, typically has to wait until the executed instruction passes the exception determination point, and the source registers are then unlocked in the scoreboard (either because no exception is detected, or after the relevant software routine has performed the necessary exception processing).

Hence, it can be seen that this requirement to lock registers whilst a determination as to the presence of an exception condition in the corresponding instruction is made can significantly impact on the efficiency of the pipeline processing circuit by causing subsequent instructions to stall if they need accesses to such locked registers.

SUMMARY OF THE INVENTION

Viewed from a first aspect, the present invention provides a data processing apparatus, comprising: a processing unit comprising a pipeline for executing a sequence of instructions; a set of source registers for storing source data required by the processing unit when executing instructions in the sequence; a locking mechanism for locking source registers dependent on configurable criteria, the configurable criteria being chosen to ensure that source registers still required for completing execution of an instruction in the pipeline are locked to prevent predetermined types of access by a subsequent instruction, the subsequent instruction only being able to enter the pipeline if the source registers relevant to that instruction can be accessed as required by the instruction; the processing unit having a first and a second mode of operation; in the first mode of operation, the processing unit being arranged, upon determination of one or more exception conditions during execution of an instruction, to invoke a process external to the pipelined execution unit to enable execution of the instruction to be completed; in the second mode of operation, the processing unit being arranged to complete execution of an instruction within the pipeline even if the presence of said one or more exception conditions is determined; the locking mechanism being arranged to alter the configurable criteria dependent on the mode of operation of the processing unit, such that a reduction in the number of source registers being locked can be achieved in the second mode of operation.

In accordance with the present invention, the processing unit has two modes of operation, the first mode of operation being one in which a process external to the pipelined execution unit is invoked upon determination of one or more exception conditions to enable execution of the instruction to be completed, whilst in the second mode of operation the processing unit is arranged to complete execution of the instruction within the pipeline even if those one or more exception conditions are present. A locking mechanism is used to lock source registers dependent on configurable criteria, and the locking mechanism is arranged to alter the configurable criteria dependent on the mode of operation of the processing unit, in order to enable a reduction in the number of source registers being locked in the second mode of operation.

Since the process external to the pipelined execution unit is likely to need access to the source registers of the instruction for which an exception condition has been detected, then it is clear that in the first mode of operation those source registers must be locked by the locking mechanism until it has been determined that no exception condition exists for that instruction, or until those source registers have been read by the process external to the pipelined execution unit following the detection of one of those exception conditions. In the second mode of operation, the processing unit is arranged such that it does not need to invoke any process external to the pipelined execution unit to deal with any of those exception conditions, and accordingly this avoids the need to lock source registers until after the presence of those one or more exception conditions is detected.

The inventors of the present invention realised that there are two basic requirements for protecting the value of a source register from being overwritten. Firstly, this must be done if the data in the source register is needed by an instruction which has not yet read the register. Secondly, this must be done if the data in the source register may be needed by a routine which has not yet executed, for example an external process used to handle exception conditions. In many cases, it was observed that the first requirement was significantly less onerous than the second requirement. Source registers locked in order to preserve them for use by external processes in the event of an exception condition being detected caused subsequent instructions to stall beyond what is required to protect the source registers whilst they have not yet been read by the instruction specifying them.

The present invention significantly alleviates this problem by providing a second mode of operation which removes the need for invoking processes external to the pipelined execution unit to deal with one or more exception conditions, and by then enabling the locking mechanism to alter the configurable criteria so that it no longer locks source register merely so that they may be available to such external processes.

In preferred embodiments, the data processing apparatus further comprises a set of destination registers for storing destination data resulting from execution of the instructions in the sequence, the locking mechanism being further arranged to lock destination registers dependent on predetermined criteria.

When an instruction specifies a destination register, it is clearly important to ensure that that register is locked until the result generated by execution of that instruction is written back to the destination register, to ensure that that destination register is not read, or written to, until the result has been stored in the destination register. Such a requirement is clearly necessary in both the first and the second mode of operation, and accordingly in preferred embodiments, the predetermined criteria used to determine locking of the destination registers is the same for both the first and second modes of operation.

In preferred embodiments, the locking mechanism comprises: a record of the locked registers; check logic for determining with reference to the record of locked registers whether the subsequent instruction can enter the pipeline; and determination logic for determining for the subsequent instruction whether any of the source registers of that instruction should be locked in the record, the determination logic being responsive to the configurable criteria.

Accordingly, the check logic determines whether the source, and optionally destination, registers specified by the subsequent instruction are already indicated as locked within the record of locked registers, typically the subsequent instruction not being allowed to enter the pipeline if any of its source and destination registers are indicated as already being locked. The determination logic determines whether any of the source registers, and optionally destination registers, specified by the subsequent instruction should be locked in the record, and since the determination logic is responsive to the configurable criteria, it will typically require the locking of less source registers when the processing circuit is operating in the second mode of operation.

It will be appreciated that the configurable criteria may be specified in a number of ways. However, in preferred embodiments, the configurable criteria is arranged in the first mode of operation such that when an instruction is to be executed by the pipeline, the locking mechanism locks source registers required by that instruction whilst those source registers may still be overwritten before they have been read by that instruction in the pipeline or whilst they may still be required by the process external to the pipeline, whereas in the second mode of operation the configurable criteria is arranged such that the locking mechanism locks source registers required by that instruction only whilst those source registers may still be overwritten before they have been read by that instruction in the pipeline.

Hence, in the second mode of operation, the source registers are locked to prevent the possibility of a write-after-read hazard condition. Hence, the desired situation is that a write to the source register should only occur after a read of that source register has taken place ("write-after-read"), and a write-after-read hazard occurs when that situation fails. Accordingly, in the second mode of operation, a source register is locked during any period of time when it is possible that that source register could be overwritten before it has been read by the instruction specifying that source register. In the first mode of operation, source registers are also locked to prevent such write-after-read hazards, but are additionally locked whilst they may still be required by the process external to the pipeline.

Having regard to the above requirement, in the second mode of operation, the configurable criteria is arranged in preferred embodiments of the present invention such that the locking mechanism does not lock any source registers for scalar instructions or for vector instructions having a number of iterations less than or equal to a predetermined value. In implementations in accordance with preferred embodiments of the present invention, it has been realised that there is no possibility of a write-after-read hazard in relation to the source registers of scalar instructions or relatively short vector instructions (i.e. vector instructions having a number of iterations less than or equal or equal to the predetermined value).

In preferred embodiments, the predetermined value is four for single precision vector instructions or for double precision vector instructions with single cycle throughput, and is two for double precision vector instructions with two cycle throughput.

For simplicity, in preferred embodiments of the present invention, the configurable criteria is such that in the second mode of operation the locking mechanism treats any double precision vector instruction as having a two cycle throughput.

The process external to the pipeline that is invoked in the first mode of operation upon detection of one or more exceptions may take a variety of forms. However, preferably, the process external to the pipeline is either support code or a user-enabled exception handling routine.

Support code performs three basic functions in preferred embodiments of the present invention. Firstly, support code can be used to process instructions and data types not supported by the hardware. For example, in preferred embodiments, a remainder instruction is not provided in the architecture specification of the processing unit, but is required by the IEEE 754 standard. Similarly, decimal data type is also not included in the architecture specification for the processing unit, but is required by the IEEE 754 standard. In preferred embodiments, the processing required for both of these exists as library functions available to the application code being executed by the processing unit.

A second function performed by the support code of preferred embodiments is to process instructions with specific data for which the hardware is incapable of completely processing the instruction given that specific data, for example potential underflow conditions or denormal operands. Some of these cases may also result in exceptions, whilst other may result in non-exceptional results. If the instruction results in an exception, and a user-enabled exception handling routine is enabled for that instruction, the support code then performs some pre-processing described below as the third basic function of the support code. If the instruction does not generate an exceptional condition, or if all of the exceptional conditions generated do not have the corresponding exception enable bit set, then the support code is arranged to write the computed result into the destination register of the instruction, and to then return to the application code being executed by the processing unit.

The third basic function of the support code of preferred embodiments is to pre-process exceptions for which the exception enable bit is set. The support code is then the first entry point for a bounced instruction. Instructions may be bounced to enable the second basic function of the support code described above to be performed, or because a valid exception has been detected and the exception enable bit for this exception is set. If the data requires preconditioning for a user-enabled exception handling routine, the support code will do this pre-conditioning. The user-enabled exception handling routine, if it chooses to return to the application code, will do so through the support code.

The above three functions of the support code are relevant to the first mode of operation of preferred embodiments. In the second mode of operation, the need to use the support code is removed by enabling execution of instructions to be completed within the pipeline even if the presence of one or more exception conditions is determined.

It will be apparent that the first and second mode of operation of the processing unit may be arranged in a variety of ways, dependent on the implementation. However, in preferred embodiments, the first mode of operation is an IEEE 754 compliant mode of operation, and the second mode of operation is an IEEE 754 non-compliant mode which avoids the need for software routines to handle said one or more exception conditions. In preferred embodiments, the first mode of operation of the processing unit is IEEE 754 compliant through the provision of support code, the support code being called when the hardware of the processing unit is unable to process an instruction with specific operands. In the second mode of operation, some of the features of the IEEE 754 standard which are not required in some applications are not processed according to the IEEE 754 specification, but instead are processed in a non-compliant manner in order to eliminate the need for the use of a process external to the pipelined execution unit.

It will be appreciated by those skilled in the art that when keeping a record of both source and destination registers, there are a variety of ways in which the locking mechanism may be arranged. In preferred embodiments, for simplicity, the locking mechanism keeps a single record for both source and destination registers, and hence makes no distinction between the two types of registers. However, in an alternative embodiment, the locking mechanism comprises a first record for recording the locked destination registers and a second record for recording the locked source registers.

Whilst this alternative approach increases the complexity somewhat, it does enable some variation in the predetermined types of access which are prevented to a locked register, depending on whether that register is a destination register or a source register. More particularly, with this alternative implementation, if the subsequent instruction needs to perform any type of access to a destination register indicated as locked in the first record, it will be stalled from entering the pipeline until the lock has been cleared from the first record, whereas if the subsequent instruction only needs to perform a read access of one or more of the source registers locked in the second record, it will be permitted to enter the pipeline without needing to wait for the relevant locks to be cleared from the second record. If a particular register is not specified as a destination register, then it is clear that the data stored in that register is not going to be changed by any of the instructions already in the pipeline. Accordingly, it is safe to allow a subsequent instruction to read such a register, and since the act of reading a register does not change the value stored in the register, then it is acceptable to read a source register even when it has been locked by an instruction already in the pipeline.

It will be appreciated by those skilled in the art that there are a variety of ways in which the processing unit may be arranged to complete execution of an instruction within the pipeline even in the presence of one or more exception conditions. In preferred embodiments, in the second mode of operation, the processing unit is arranged to employ a flush-to-zero mode to replace any source data or result data in the denormal range with a positive zero. It has been found that this mode of operation removes the complexity and hardware that would otherwise be required to process denormal data values, with none or very little arithmetic impact on well understood algorithms.

Further, in the second mode of operation of preferred embodiments, the processing unit is arranged to employ a default NaN (Not-a-Number) mode to produce as result data a default NaN if any of the source data is a NaN. This approach processes NaNs according to the IEEE 754 specification, but not consistent with common practice. Nevertheless, it still provides handling for NaNs as indications of an undefined arithmetic operation.

Furthermore, in the second mode of operation of preferred embodiments, the processing unit is arranged to process within the hardware of the processing unit any overflow, inexact, divide-by-zero or invalid exception conditions. More particularly, in preferred embodiments, full default processing is provided for overflow, inexact and divide-by-zero exceptions in hardware, and near full default processing is provided for invalid exceptions in hardware. It has been found that this approach provides near IEEE 754 compliance, and is suitable for most embedded applications which use overflow for saturation and infinity for special processing situations.

Viewed from a second aspect, the present invention provides a method of operating a data processing apparatus having a processing unit comprising a pipeline for executing a sequence of instructions, and a set of source registers for storing source data required by the processing unit when executing instructions in the sequence, the method comprising the steps of (i) employing a locking mechanism to lock source registers dependent on configurable criteria, the configurable criteria being chosen to ensure that source registers still required for completing execution of an instruction in the pipeline are locked to prevent predetermined types of access by a subsequent instruction, the subsequent instruction only being able to enter the pipeline if the source registers relevant to that instruction can be accessed as required by the instruction; (ii) selecting a first or a second mode of operation for the processing unit, in the first mode of operation, the pipelined processing unit being arranged, upon determination of one or more exception conditions during execution of an instruction, to invoke a process external to the pipelined execution unit to enable execution of the instruction to be completed, in the second mode of operation, the pipelined processing unit being arranged to complete execution of an instruction within the pipeline even if the presence of said one or more exception conditions is determined; and (iii) causing the locking mechanism to alter the configurable criteria dependent on the mode of operation of the processing unit, such that a reduction in the number of source registers being locked can be achieved in the second mode of operation.

BRIEF DESCRIPTION OF THE DRAWINGS

The present invention will be described, further by way of example only, with reference to a preferred embodiment thereof as illustrated in the accompanying drawings, in which:

FIGS. 5A and 5B are diagrams illustrating the sequence of execution of back-to-back arithmetic operations in the first mode and second mode of operation, respectively, where the second instruction has as the destination a source register of the first instruction;

FIGS. 6A and 6B are diagrams illustrating the sequence of execution of an arithmetic instruction followed by a load instruction in the first mode and second mode of operation, respectively, in which the load instruction is writing to one or more of the source registers of the arithmetic instruction;

FIGS. 7A to 7C illustrate the sequence of execution of a vector instruction followed by a load instruction, the first mode of operation being illustrated in FIG. 7A and the second mode of operation being illustrated in FIGS. 7B and 7C;

FIGS. 8A and 8B illustrate the sequence of execution of a single precision vector instruction and a double precision vector instruction, respectively, in both cases the instruction being followed by a load instruction, and illustrate the conditions which necessitate locking of source registers; and FIGS. 9A to 9F are tables illustrating how source registers are locked and cleared for both single-precision and double-precision instructions in both the first and second modes of operation.

DESCRIPTION OF A PREFERRED EMBODIMENT

Figure 1:
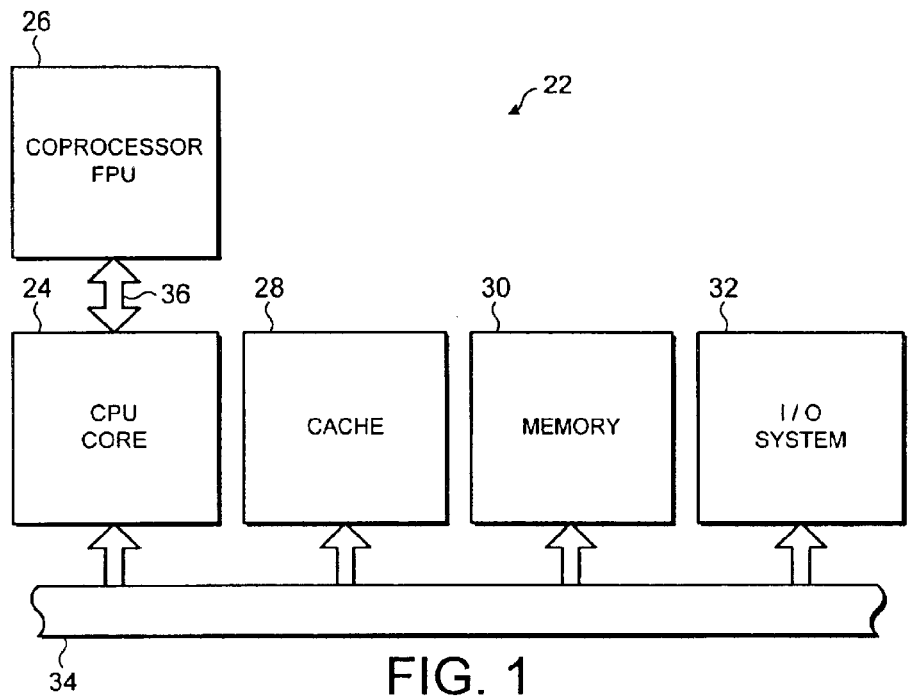
FIG. 1 is a block diagram illustrating elements of a data processing apparatus in accordance with preferred embodiments of the present invention.

FIG. 1 illustrates a data processing system 22 comprising a main processor 24, a floating-point unit (FPU) coprocessor 26, a cache memory 28, a main memory 30 and an input/output system 32. The main processor 24, the cache memory 28, the main memory 30 and the input/output system 32 are linked via a main bus 34. A coprocessor bus 36 links the main processor 24 to the floating-point unit coprocessor 26.

In operation, the main processor 24 (also referred to as the ARM core) executes a stream of data processing instructions that control data processing operations of a general type including interactions with the cache memory 28, the main memory 30 and the input/output system 32. Embedded within the stream of data processing instructions are coprocessor instructions. The main processor 24 recognises these coprocessor instructions as being of a type that should be executed by an attached coprocessor. Accordingly, the main processor 24 issues these coprocessor instructions on the coprocessor bus 36 from where they are received by any attached coprocessors. In this case, the FPU coprocessor 26 will accept and execute any received coprocessor instructions that it detects are intended for it. This detection is via a coprocessor number field within the coprocessor instruction.

Figure 2A:
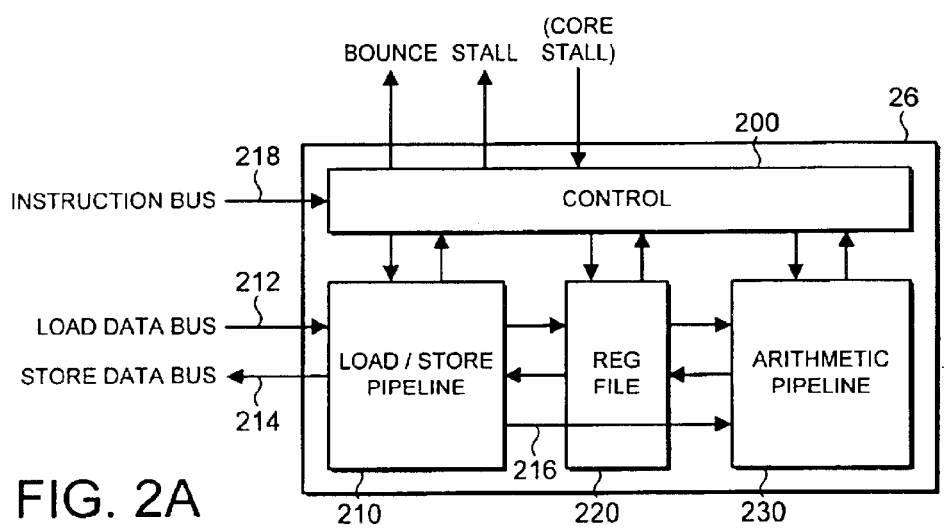
FIG. 2A is a block diagram illustrating elements of the coprocessor of FIG. 1 in accordance with preferred embodiments of the present invention.

FIG. 2A is a block diagram illustrating in more detail the elements provided within the coprocessor 26 in accordance with preferred embodiments of the present invention. The coprocessor 26 includes an arithmetic pipeline unit 230 for performing arithmetic operations. A register file 220 is provided consisting of a number of registers which can either be specified as source registers or destination registers for the instructions executed by the arithmetic pipeline unit 230. A load/store pipeline unit 210 is also provided for executing load and/or store instructions to load data values received over the load data bus 212 into the register file 220, or to output from the register file 220 onto the store data bus 214 data values for storage elsewhere within the data processing system, for example within the cache 28 or the memory 30. In preferred embodiments, forwarded path 216 is also provided for enabling data values to be passed directly from the load/store pipeline unit 210 to the arithmetic pipeline unit 230 bypassing the register file 220.

In preferred embodiments, the load/store pipeline unit 210, the register file 220 and the arithmetic pipeline unit 230 are all controlled by a control logic 200, the control logic 200 being arranged to receive instructions from the core 24 over instruction bus 218, and to issue those instructions to the load/store pipeline unit 210 or the arithmetic pipeline unit 230 as appropriate. The control logic 200 also indicates to the register file 220 into which registers to place data values received from the load/store pipeline unit 210 during execution of a load instruction, and when a store instruction is being executed identifies the register whose content should be output to the load/store pipeline unit 210. As will be discussed in more detail later, the control logic 200 is also arranged to issue bounce and stall signals to the core 24 as and when required, and is further responsive to a core stall signal received from the core 24 to stall execution of the coprocessor 26.

Figure 2B:
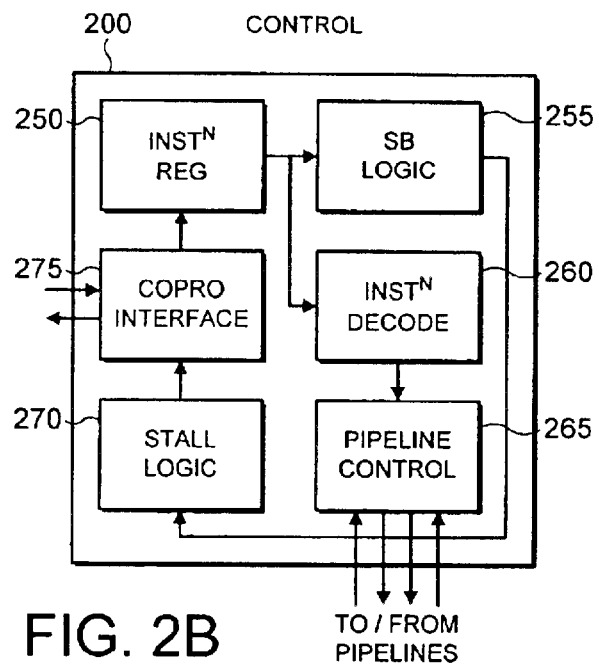
FIG. 2B is a block diagram illustrating in more detail the elements provided within the control logic of the coprocessor in accordance with preferred embodiments of present invention.

More details of the control logic 200 of preferred embodiments are shown in FIG. 2B. The control logic 200 includes a coprocessor interface 275 for receiving signals from, and issuing signals to, the core 24. When a new instruction is received by the coprocessor interface 275, it is passed to an instruction register 250. From here, the instruction is provided to an instruction decoder unit 260 and to scoreboard logic 255. The instruction decoder 260 decodes the instruction, and then passes it to a pipeline control unit 265 which interfaces with the pipelines 210, 230 to control their execution.

The scoreboard logic 255 of preferred embodiments will be described in more detail with reference to FIG. 3, but basically is arranged to determine based on the received instruction whether any registers specified by that instruction are already locked in the scoreboard, and which registers, if any, should be locked in the scoreboard once that instruction has been issued to the pipeline to ensure that they are not used by a subsequent instruction. If it is determined that any registers specified by the instruction are already locked in the scoreboard, then the scoreboard logic 255 is arranged to issue a stall signal to the stall logic 270. The stall logic 270 receives the stall signal, along with any other stall condition signals, for example resource stalls, and will generate a final stall signal if any such stall signals are received at its input. The final stall signal is in preferred embodiments output via the coprocessor interface 275 to the processor core to advise the processor core that the coprocessor has had to stall execution of the instruction. Once the instruction has finally entered the execution pipeline (i.e. following the clearing of any locked registers causing the instruction to be stalled), then the scoreboard is updated within the scoreboard logic 255 to lock any registers required to be locked for use by that instruction.

Figure 3:
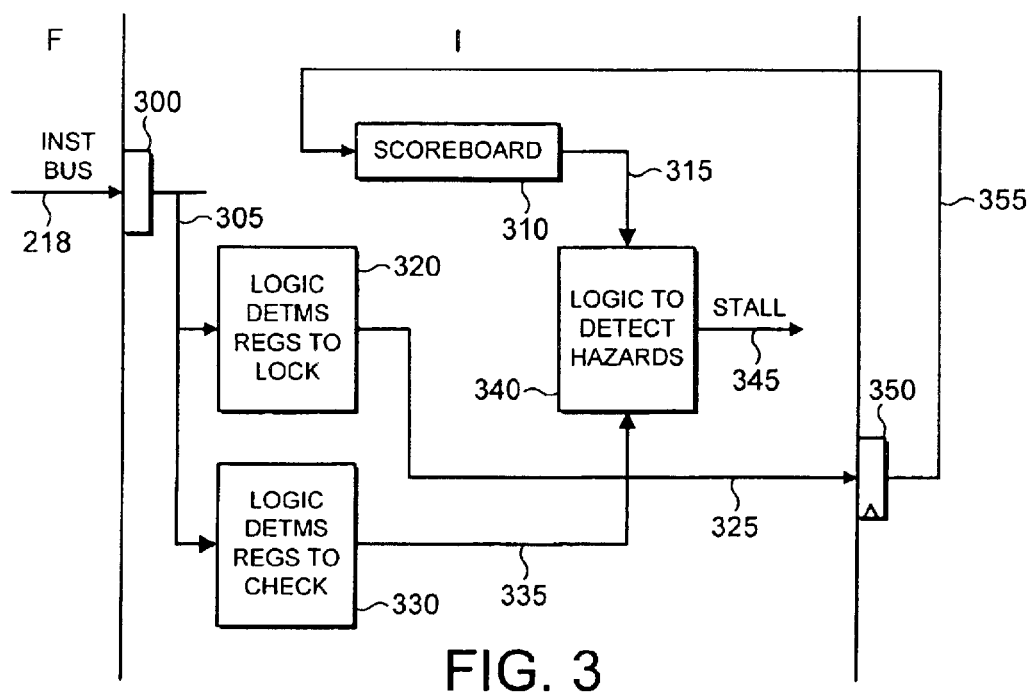
FIG. 3 is a diagram schematically illustrating the operation of the scoreboard logic in accordance with preferred embodiments of the present invention.

FIG. 3 is a block diagram illustrating more details of the scoreboard logic 255 of preferred embodiments of the present invention. In preferred embodiments, the scoreboard logic is used during the issue stage of the coprocessor pipeline, the various stages of the coprocessor pipeline being discussed in more detail later with reference to FIG. 4. When an instruction is sent from the core to the coprocessor, it is received in the coprocessor fetch stage over the coprocessor instruction bus 218 and placed within a register 300. The coprocessor is arranged to evaluate the instruction in the issue stage, and this process, along with the subsequent processing of the instruction, will be described in more detail later with reference to FIG. 4. However, dealing specifically with the issue of the scoreboard processing, the instruction as stored within the register 300 is passed over path 305 to logic elements 320 and 330. The logic 330 is arranged to determine the registers which need checking against the locked registers in the scoreboard 310 to determine whether the instruction can be issued into the pipeline for execution. As an example, if the instruction is FADDS S0, S1, S2, where S1 and S2 are source registers and S0 is the destination register, then logic 330 will determine that registers 0, 1 and 2 should be checked.

In preferred embodiments, the register file 220 illustrated in FIG. 2A will contain 32 registers, and the logic 330 is arranged to output a 32-bit value, referred to as hereafter as the "check value" or CV for short, with each bit being used to identify whether a corresponding register should be checked to determine whether that register is locked in the scoreboard. Given the earlier example, where registers S0, S1 and S2 are specified, then the least three significant bits of the CV will be set, with the remaining bits unset, to indicate that only registers 0, 1 and 2 need checking.

The 32-bit CV generated by logic 330 will be output over path 335 to stall logic 340, which is also arranged to receive over path 315 from the scoreboard 310 a similar 32-bit value identifying those registers which are locked within the scoreboard 310. If comparison of these two values by logic 340 indicates that any of the registers to be checked are locked in the scoreboard, then logic 340 will generate a stall signal over path 345, which as discussed earlier will then be output to stall logic 270 for use in generating a final stall to the coprocessor interface 275. If the stall signal is asserted, then the current instruction cannot proceed to the decode stage of the pipeline, and will only proceed into the decode stage once the stall signal has been de-asserted.

The logic 320 is arranged to determine from the instruction stored in the register 300 those registers, if any, that should be locked within the scoreboard 310 once the instruction has proceeded to the decode stage of the pipeline. This logic 320 uses configurable criteria to determine which registers, if any, should be locked, and this configurable criteria is varied dependent on the mode of operation of the processing unit. In preferred embodiments, the processing unit has two modes of operation, in a first mode of operation the processing unit being arranged upon detection of one or more exception conditions to invoke processes external to the pipelined execution unit to enable execution of the instruction to be completed, whereas in the second mode of operation, the processing unit is arranged to complete execution of such instructions within the pipeline even if the presence of those one or more exception conditions is determined.

The criteria applied in the two modes of operation will be discussed in more detail later. However, for the time being, it should be noted that in the first mode of operation all of the source register or registers and the destination register or registers are to be locked in the scoreboard, whereas in the second mode of operation source register or registers are not locked for scalar instructions, or for any vector instructions that are short enough to ensure that there is no possibility that the source register(s) can be overwritten before they are read by the instruction. In preferred embodiments, this equates to no source registers being locked for single precision vector instructions of four or less iterations or for double precision vector instructions having no more than two iterations (all double precision vector instructions being considered to have two cycle throughput in preferred embodiments).

Hence, with reference to the earlier example of an add instruction specifying So as the destination register and S1 and S2 as the source registers, then in the first mode of operation, registers 0, 1 and 2 will all be identified by the logic 320 for locking in the scoreboard 310. This first mode of operation will also be referred to herein as a non-RunFast mode of operation. However, in the second mode of operation (which is also referred to herein as a RunFast mode of operation), only the destination register S0 is identified by the logic 320 for locking in the scoreboard 310. As with the logic 330, the logic 320 is in preferred embodiments arranged to output a 32-bit value, hereafter referred to as a scoreboard value, or SV for short, identifying those registers to be added to the scoreboard 310 once the instruction has proceeded to the decode stage, this 32-bit SV being output over path 325 to register 350. Once the instruction has entered the decode stage, the contents of register 350 are output over path 355 for adding to the scoreboard 310.

If the FADDS instruction mentioned earlier were then followed by the instruction FADDS S5, S1, S6, then the following differences in operation will occur, dependent on whether the processing unit is operating in non-RunFast mode or in RunFast mode. In non-RunFast mode, the SV signal output by logic 320 will have bits 1, 5 and 6 set, whereas if the data processing unit is operating in RunFast mode, then only bit 5 will be set to specify the destination register S5. Irrespective of which mode of operation is being used, the CV signal output over path 335 by logic 330 will have bits 1, 5 and 6 set. However, the registers locked in the scoreboard 310 as a result of operation of the FADDS S0, S1, S2 instruction will be different dependent on whether the mode of operation is non-RunFast or RunFast mode, and accordingly the scoreboard signal received by the stall logic 340 over path 315 will be different dependent on the mode of operation. More particularly, in non-RunFast mode register S1 will have been locked in the scoreboard 310, and accordingly the logic 340 will now generate a stall during the issue stage of the instructions FADDS S5, S1, S6. However, if the data processing unit is running in RunFast mode, then only the destination register S0 will have been added to the scoreboard 310 as a result of executing the instruction FADDS S0, S1, S2, and accordingly, assuming none of the registers S5, S1 or S6 have been locked in the scoreboard 310 due to execution of any other instructions, then no stall will be generated by the stall logic 340, and instead the instruction FADDS, S5, S1, S6 can proceed directly into the decode stage, thereby decreasing the time required to process the instructions.

Figure 4:
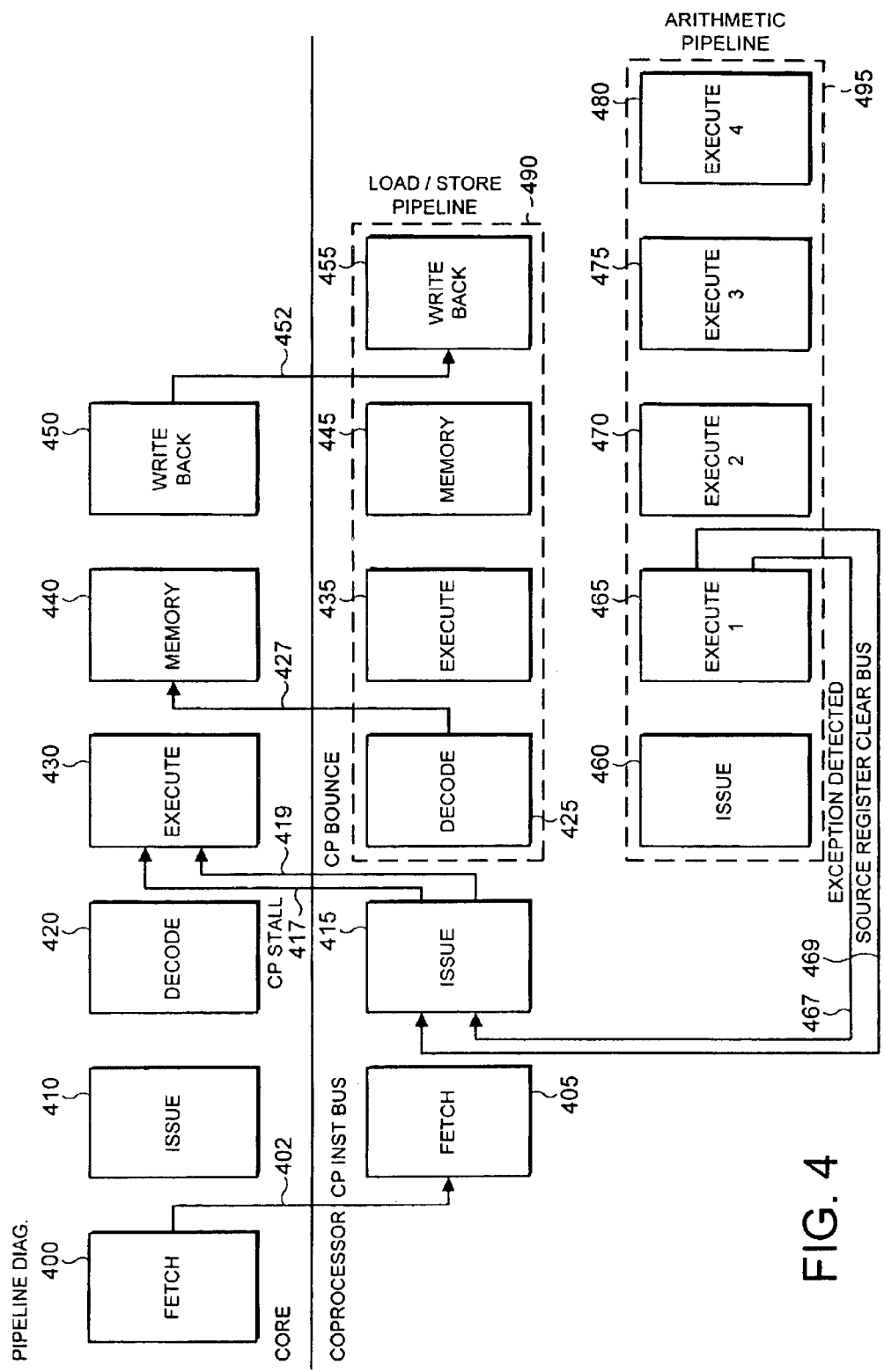
FIG. 4 is a block diagram illustrating the basic flow of the pipelines within the processor core and the coprocessor in accordance with preferred embodiments of the present invention.

FIG. 4 illustrates the interaction between the processor core pipeline, and the two pipelines of the coprocessor in preferred embodiments of the present invention. It should be noted that there is no requirement for only two coprocessor pipelines, and in alternative embodiments more pipelines could be added to handle different sets of instructions or to provide overlap between the sets of instructions.

The coprocessor 26 has a seven stage pipeline operating one stage behind the core pipeline. Instructions are sent from the core Fetch stage 400 to the coprocessor Fetch stage 405 over a coprocessor instruction bus 402. The coprocessor evaluates the instruction in the Issue stage 415. If the coprocessor 26 has processed an exceptional instruction in the non-RunFast mode of operation, but not yet signalled the core 24 of that fact, then a bounce signal is asserted to the core at the issue stage 415 over path 419. The core will then begin exception processing of the exceptional instruction and retry the instruction which caused the bounce upon return from exception processing.

In the core fetch stage 400, instructions are read from an instruction buffer and, if it is a coprocessor instruction, it is driven on the coprocessor instruction bus 402 to the coprocessor fetch cycle 405.

In the core issue stage 410 the core does little to a coprocessor instruction. In the core decode stage 420 the core processes stalls to the coprocessor for core related stall conditions. For example, if the core detects a stall condition on a prior core instruction, it may need to instruct the coprocessor to stall accordingly. Such a signal issued by the core from the core decode cycle 420 will be passed to the decode, issue and fetch stages of the relevant coprocessor pipeline. For clarity this signal is not shown in FIG. 4.

In the core execute stage 430 the core receives the bounce and stall signals from the coprocessor over paths 419, 417, respectively, and if the bounce signal is asserted for a valid coprocessor instruction, begins exception processing.

In the core memory cycle 440, the core receives from the decode stage 425 of the load/store pipeline 490 of the coprocessor store data on the coprocessor store data bus 427. In the core writeback stage 450, the core drives load data to the writeback stage 455 of the load/store pipeline 490 of the coprocessor on the coprocessor load data bus 452.

In the coprocessor fetch stage 405, the coprocessor receives the instruction on the coprocessor instruction bus 402 and begins decoding of the instructions.

In the coprocessor issue stage 415, the coprocessor evaluates the instruction and the current state of the scoreboard and determines if the instruction can be issued. If the scoreboard indicates a register is unavailable, or if the pipeline is busy and the current instruction cannot proceed to the Decode stage, the CP Stall signal is asserted over path 417 and held until the instruction may proceed or is cancelled by the core.

In the non-RunFast mode of operation, if a prior instruction has completed the coprocessor Execute 1 stage 465 of the arithmetic pipeline 495 and was determined to be exceptional, the coprocessor is said to be in the "exceptional state." A coprocessor instruction which does not access the control registers which is stalled when the determination is made or is issued to the coprocessor after the determination is made will be a "trigger" instruction and will cause the CP Bounce signal to be asserted from the issue stage 415 over path 419. Once this bounce signal has been asserted, the core will begin exception processing and retry the trigger instruction when processing resumes after exception processing.

If a stall does not exist and the coprocessor is not in the exceptional state, the scoreboard is updated with the destination register(s) and any source register(s) which require locking, and the instruction progresses to the coprocessor decode stage of the relevant pipeline 490, 495 of the coprocessor.

In the coprocessor decode stage, the coprocessor passes an arithmetic instruction, with its operands, to the pipeline or functional unit which will process the instruction. If the instruction is a load or store instruction, it is passed to the load/store pipeline 490. If the operation is a store of data from the coprocessor to the core, the coprocessor will, at decode stage 425, read the store data from the register file and drive the cp store data bus 427 with the data, where it is then received by the memory stage 440 of the core. If the instruction is a load operation, the decode stage 425 of the coprocessor passes the instruction through the execute 435 and memory stages 445 of the load/store pipeline 490.

In the coprocessor memory stage 445, the coprocessor passes a load operation to the writeback stage 455. In the coprocessor writeback stage 455, load data received from the writeback stage 450 of the core over path 452 is written to the coprocessor register file.

Looking now at the arithmetic pipeline 495 of the coprocessor, in the coprocessor execute 1 stage 465 the arithmetic instruction begins processing by evaluating the signs, exponents and whether the fractions are zero in order to determine if the instruction has a potential exception. If so, and the coprocessor is not in RunFast mode, the exception detected signal is driven to the coprocessor issue stage 415 over path 467. If no exception is detected, the instruction is passed to the execute 2 stage. The coprocessor execute 2 and execute 3 stages further process the instruction. The coprocessor execute 4 stage completes the instruction, sets any condition code or exception status bits, and writes the result to the register file or forwards the result to another functional unit.

To enable registers locked in the non-RunFast mode to be cleared from the scoreboard when no exceptions are determined, a source register clear bus 469 is provided to enable information about the registers no longer needing to be locked to be passed from the E1 stage 465 back to the issue stage 415.

Having described the interaction between the various pipelines of the preferred embodiment of the present invention, examples of execution flow comparing the non-RunFast and RunFast modes of operation will now be described with references to FIGS. 5A to 8B.

FIGS. 5A and 5B illustrate execution of back-to-back arithmetic operations in which the second instruction has as the destination a source register of the first instruction, FIG. 5A illustrating the hazard case in non-RunFast mode.

In FIG. 5A, the Floating-point Coprocessor Data Processing (FCDP) instruction FCDP1 is issued to the coprocessor in cycle 1 and requires S1 and S2 as source registers and S0 as destination register. In cycle 2 the coprocessor locks registers S0, S1, and S2, and the core issues FCDP2 to the coprocessor. FCDP2 requires S3 and S4 as source registers, and S1 as destination register. In cycle 3, the scoreboard is checked for FCDP2 in the issue stage and a lock is found on S1. FCDP2 hence stalls in the Issue stage until the lock is removed on S1.

The lock must remain on S1 to protect the contents from being overwritten in the case of FCDP1 being exceptional and requiring software routines to process the exception. The exception check is made for FCDP1 in cycle 4 (i.e. the execute 1 stage). In this example, FCDP1 is not exceptional, and at the end of cycle 4 the lock is removed in the scoreboard for S1 and S2 and the exception detected signal is not asserted. In the next cycle, cycle 5, FCDP2 is hence allowed to enter the decode stage, whilst the coprocessor locks S1, S3 and S4 to protect them for use by FCDP2. It can be seen that a one-cycle stall is required to guarantee S1 is protected from overwriting.

In the case of FCDP1 not being exceptional, FCDP2 could have progressed immediately into the decode stage. Since FCDP1 would have read S1 before FCDP2 could have overwritten the register with the result of FCDP2, no hazard condition would hence have existed. Thus, the need to lock source registers until exception determination takes place adversely affects processing speed in those instances where no exception actually exists.

FIG. 5B illustrates the hazard case in RunFast mode for reuse of source registers. In FIG. 5B, the situation of FIG. 5A is repeated but in RunFast mode. No longer must the source registers be protected for use by software against overwriting, and S1 and S2 are not locked in the issue stage of FCDP1. FCDP2 does not stall, given that no register hazard is detected in the issue stage of FCDP2, and a one cycle stall is removed from the time to process FCDP2.

FIGS. 6A and 6B illustrate execution of an arithmetic instruction followed by a load instruction in which the load is writing to one or more of the source registers of the first instruction, FIG. 6A illustrating the hazard case in non-RunFast mode for load of prior source registers.

In FIG. 6A, the load following the FCDP instruction will write new data into S1. The current data in S1 must be protected for use by the FCDP instruction and by software routines if the FCDP instruction is exceptional. The FCDP instruction will cause scoreboard locks to be set on S0, S1, and S2 in the FCDP Issue stage in cycle 2. The load instruction will stall for one cycle until the lock is cleared after the execute 1 cycle of the FCDP instruction. The load instruction will then write new data into S1 in the beginning of the writeback stage in cycle 8.

FIG. 6B illustrates the hazard case in RunFast mode for load of prior source registers. In FIG. 6B, the source registers are not locked for the FCDP instruction, and the load instruction does not stall in the issue stage in cycle 3, but proceeds to the decode stage in cycle 4. The data is written into S1 by the load instruction in cycle 7, 4 cycles after it is read by the FCDP instruction in the decode stage.

Figure 7A:
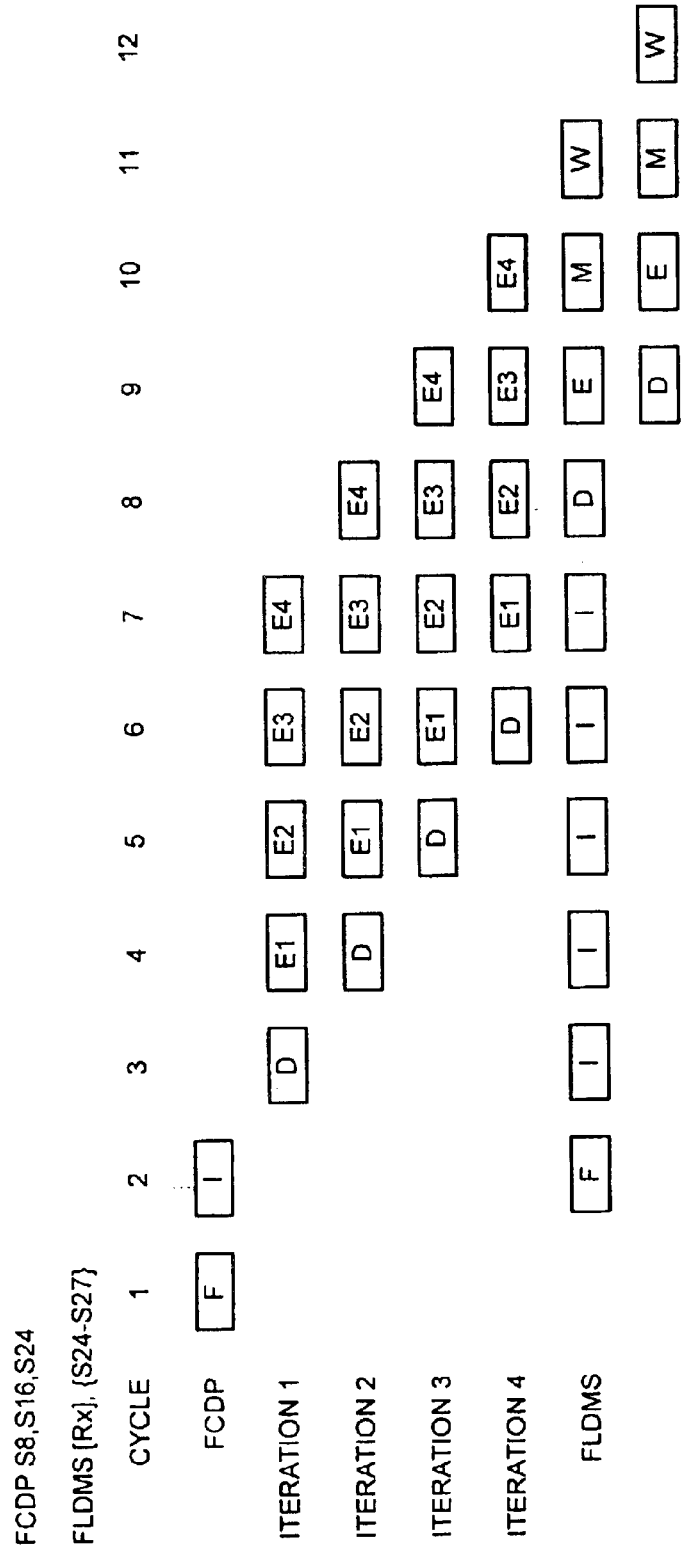
Figure 7C:
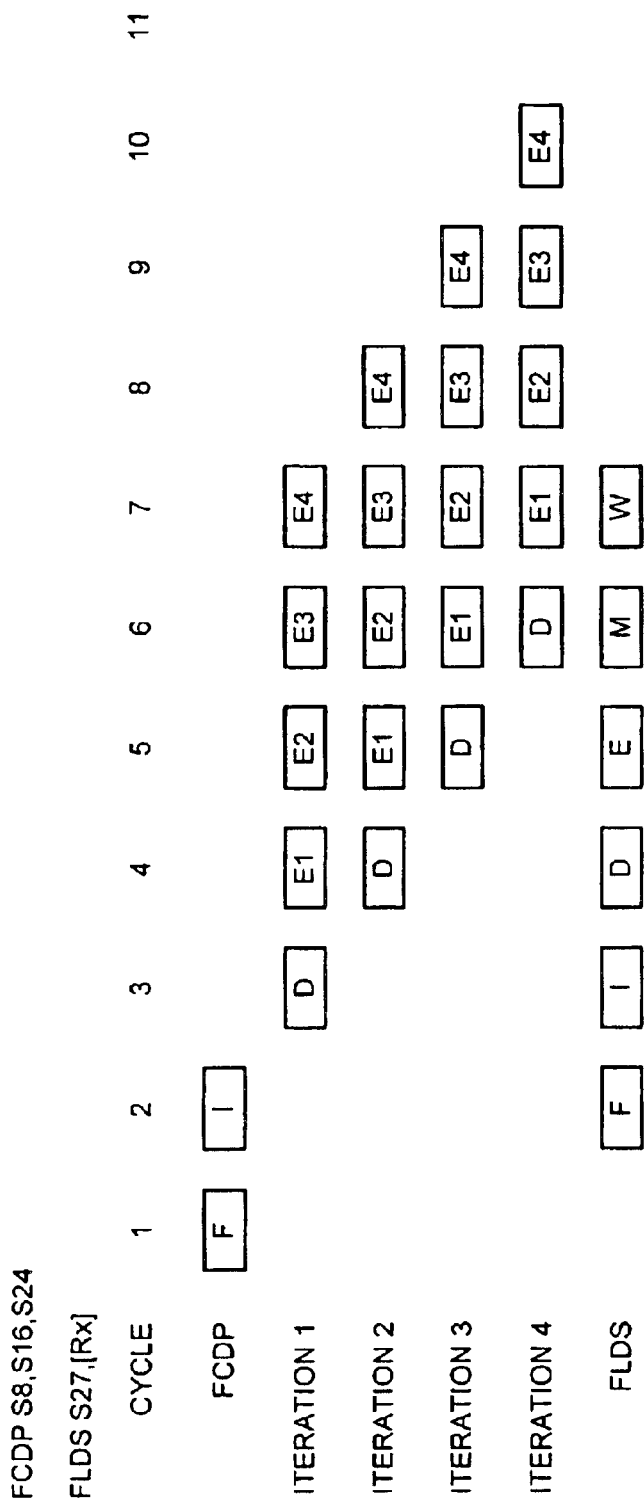

FIGS. 7A to 7C illustrates flow of execution of a single precision vector instruction with a length of 4, followed by a load instruction. In FIG. 7A, the vector instruction is followed by a source register load in non-RunFast mode.

In FIG. 7A, the instruction FCDP is a vector operation with 4 iterations. The 4 iterations are:

FCDP S8, S16, S24

FCDP S9, S17, S25

FCDP S10, S18, S26

FCDP S11, S19, S27 issued one per cycle in a serial fashion.

The FLDMS instruction (load multiple with the final S denoting single precision) will load S24 and S25 in a single cycle over a 64-bit bus, and S26 and S27 in the following cycle. The FCDP instruction, running in non-RunFast mode, locks the following registers in the Issue stage in cycle 2:

S8–S11

S16–S19

S24–S27

The FCDP instruction will clear the scoreboard for S16 and S24 in cycle 4 (the Execute 1 stage for the first iteration), S17 and S25 in cycle 5 (the Execute 1 stage for the second iteration), S18 and S26 in cycle 6 (the Execute 1 stage for the third iteration), and S19 and S27 in cycle 7 (the Execute 1 stage for the last iteration). The FLDMS instruction will stall until S24–S27 are cleared in the scoreboard, which occurs in cycle 7, giving a total of 4 stall cycles.

FIG. 7B illustrates the same vector instruction being followed by the same source register load of all registers, but this time in RunFast mode. In FIG. 7B, in the issue stage for the FCDP instruction only the destination registers are locked (S8–S11). The FLDMS instruction is hence allowed to proceed without stalling, and loads the first two registers (S24 and S25) in cycle 7 and the second two registers (S26 and S27) in cycle 8. The FCDP instruction will read S24 in the decode stage in cycle 3, S25 in cycle 4, S26 in cycle 5, and S27 in cycle 6. Hence, no hazard occurs despite the fact that the FLDMS instruction was not installed.

FIG. 7C illustrates the same vector instruction followed by a source register load of the last register in RunFast mode. In FIG. 7C, the load instruction is hence replaced with a single value load of the last source register, S27. Notice that the write of the new load data is done in cycle 7, which is one cycle later than the decode cycle for iteration 4 (which reads S27), and hence again no hazard occurs even though the FLDS instruction is not stalled.

Figure 8B:
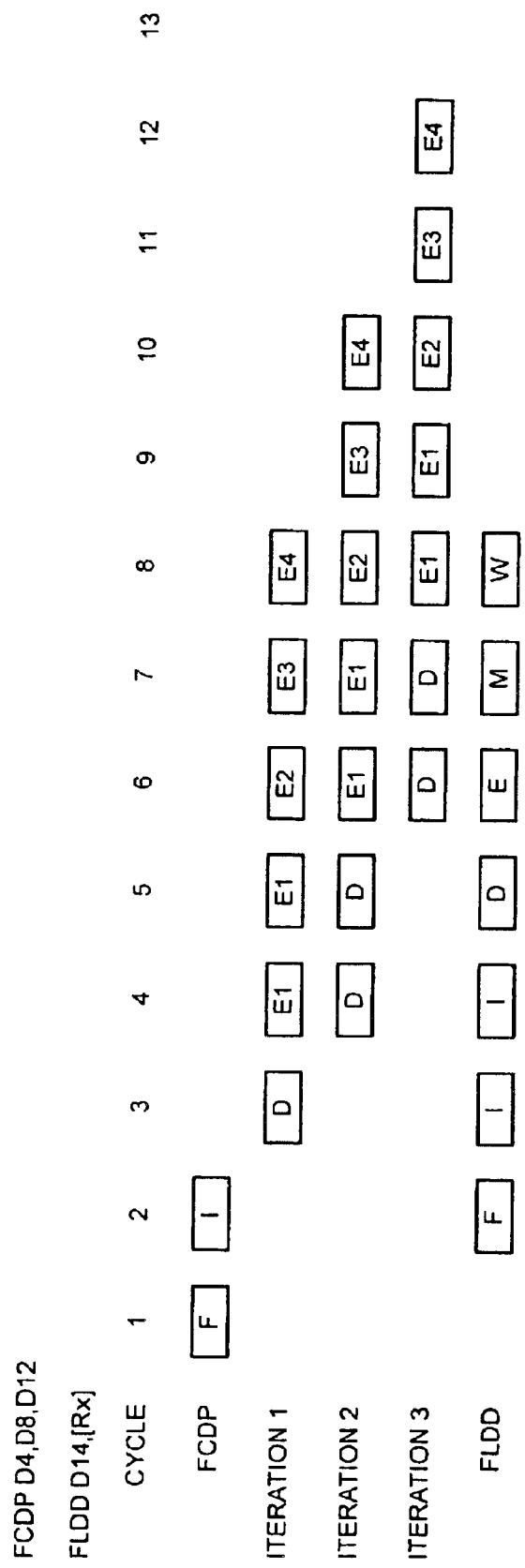

FIGS. 8A and 8B are provided to illustrate conditions which necessitate locking source registers for single-precision (SP) and double-precision (DP) instructions, even when using the RunFast mode of operation.

Two cases in which it is necessary to lock source registers in RunFast mode are:

single-precision vector instructions (or double-precision vector instructions with single cycle throughput) of length greater than 4 iterations; and double-precision vector instructions which involve a multiply (i.e. have two cycle throughput), when the instructions are of length greater than 2 iterations.

In preferred embodiments, it is not necessary to lock any double-precision vector instructions which do not involve a multiply (i.e. have single cycle throughput), since in preferred embodiments such vector instructions can only have a maximum length of 4 iterations anyway. However, in one embodiment all double-precision vector instructions are treated as having two cycle throughput, and thus source registers are locked whenever a double precision vector instruction of length greater than 2 iterations is observed. This is done in order to simplify processing.

FIG. 8A illustrates a single-precision vector instruction of length 7, followed by a load instruction. The vector instruction will perform, again in a serial fashion, the following operations:

| Iteration | Operation |
| --- | --- |
| 1 | FCDP S8, S16, S24 |
| 2 | FCDP S9, S17, S25 |
| 3 | FCDP S10, S18, S26 |
| 4 | FCDP S11, S19, S27 |
| 5 | FCDP S12, S20, S28 |
| 6 | FCDP S13, S21, S29 |
| 7 | FCDP S14, S22, S30 |

In FIG. 8A, a single-precision vector instruction of length 7 requires S30 as a source operand register for the $7^{th}$ iteration. The following load of S30 is required to stall until the lock for S30 is cleared. In RunFast mode the locks are set for source registers used in iterations after the $4^{th}$ iteration for single-precision operations, and after the $2^{nd}$ iteration for double-precision operations (in preferred embodiments, all double-precision operations are treated as having two cycle throughput irrespective of whether they involve a multiplication).

FIG. 8A illustrates a single-precision vector instruction, and in such cases the locks are cleared in the execute 1 cycle for the iteration numbered 4 greater than the current iteration. This is illustrated by the following table (where a '0' indicates that a lock is cleared, and a '1' indicates that a lock is set):

TABLE 1

| Scoreboard | Cycles | | | | |
|---|---|---|---|---|---|
| Locks | 2 | 3 | 4 | 5 | 6 |
| S16, S24 | 0 | | | | |
| S17, S25 | 0 | | | | |
| S18, S26 | 0 | | | | |
| S19, S27 | 0 | | | | |
| S20, S28 | 1 | 1 | 0 | | |
| S21, S29 | 1 | 1 | 1 | 0 | |
| S22, S30 | 1 | 1 | 1 | 1 | 0 |

As shown in the table, only the source registers required by the $5^{th}$, $6^{th}$ and $7^{th}$ iterations are locked. Hence, in cycle 2 locks are set for registers S20, S21, S22, S28, S29, and S30. The locks for S20 and S28 are cleared in cycle 4 (the execute 1 stage for source iteration 1), the locks for S21 and S29 are cleared in cycle 5 (the execute 1 stage for iteration 2), and the locks for S22 and S20 are cleared in cycle 6 (the execute 11 stage for iteration 3). The FLDS instruction is hence stalled for 3 cycles until the scoreboard is cleared for S30 in cycle 6. The FLDS instruction is then allowed to proceed into the decode stage in cycle 7 and writes to the register file in cycle 10. In cycle 9 the $7^{th}$ iteration of the FCDP instruction reads S30, avoiding the corruption of the source data for the $7^{th}$ iteration.

FIG. 8B illustrates a double-precision vector instruction which involves a multiply, and has 3 iterations.

The vector instruction will perform, again in a serial fashion, the following operations:

| Iteration | Operation |
|---|---|
| 1 | FCDP D4, D8, D12 |
| 2 | FCDP D5, D9, D13 |
| 3 | FCDP D6, D10, D14 |

In FIG. 8B the double-precision vector involves a multiplication, and will have a throughput of one operation per 2 cycles. Thus the execute 1 stage takes two cycles to complete. The following table illustrates the source register locking:

TABLE 2

| Scoreboard | Cycles | | |
|---|---|---|---|
| Locks | 2 | 3 | 4 |
| D8, D12 | 0 | | |
| D9, D13 | 0 | | |
| D10, D14 | 1 | 1 | 0 |

As shown in the table, only the source registers required for the $3^{rd}$ iteration are locked. Hence, locks are set on D10 and D14 in cycle 2 and cleared in cycle 4 (double precision locks for operations involving a multiplication are cleared for the iteration numbered 2 greater than the current iteration in the execute 1 stage). The FLDD instruction (where the final D denotes double-precision) is allowed to proceed to the decode stage in cycle 5 and writes to D14 in cycle 8. The double-precision operation reads source data in the second decode stage, and hence D14 is read in cycle 7, thereby avoiding the corruption of the source data for the $3^{rd}$ iteration.

Having described by way of example how registers are locked and cleared in either the non-RunFast mode or the RunFast mode, reference will now be made to FIGS. 9A to 9F which provide further specific details of registers locked and cleared in particular modes of operation.

FIG. 9A illustrates single-precision source register locking and clearing in the non-RunFast mode of operation. In preferred embodiments, the maximum number of iterations for a single-precision vector instruction is 8, and in non-RunFast mode the source registers for all iterations are locked in the issue stage of the pipeline. This is shown by the use of the letter "X" in the left-hand side of FIG. 9A. Hence, the rows along the top of FIG. 9A identify, by iteration number, the source registers involved in that iteration. For instance, if the number of iterations is 5, the registers associated with iterations 1 through 5 will be locked, and are denoted by the "X" in the row identified as iteration 5 and the columns in the left-hand side of FIG. 9A identified as iterations 1 through 5.

As described earlier with reference to FIGS. 7A to 7C, the source registers for a particular iteration are cleared in the execute 1 stage of the pipeline. Hence the source registers for the first iteration will be cleared in cycle 4, the source registers for the second iteration will be cleared in cycle 5, etc, this being shown by the right-hand side of FIG. 9A.

FIG. 9B is a table of the same format as FIG. 9A, but illustrates single-precision source register locking and clearing in RunFast mode. As mentioned previously, if the vector instruction is four iterations or less, then no source registers need to be locked. This can be seen from the left-hand side of FIG. 9B, where source registers only begin to be locked once the number of iterations is five or more. As before, the right-hand side of the table indicates the cycle in which the source registers for a particular iteration are cleared. Accordingly, taking the example of a vector instruction with seven iterations, the locks on the source registers for iteration 5 are cleared in cycle 4 (i.e. the execute 1 stage for iteration 1), the locks on the source registers of iteration 6 are cleared in cycle 5, and the locks on the source registers of iteration 7 are cleared in cycle 6.

FIGS. 9C and 9D are tables illustrating double-precision source register locking and clearing in non-RunFast mode, FIG. 9C relating to double-precision vector instructions with single cycle throughput, whilst FIG. 9D relates to double-precision vector instructions with two cycle throughput (i.e. vector instructions involving a multiply). As shown in these figures, all source registers are locked in non-RunFast mode. With single-cycle throughput, the locks on source registers for a particular iteration are cleared when that iteration reaches the E1 stage of the pipeline, and accordingly the locks on the source registers for iteration 1 are cleared in cycle 4, the locks on the source registers for iteration 2 are cleared in cycle 5, etc. However, with two cycle throughput, each iteration spends two cycles in the E1 stage, and accordingly whilst the locks for source registers of iteration 1 are cleared in cycle 4 as with a single cycle throughput, the locks for the source registers of iteration 2 are cleared in cycle 6, the locks for source registers of iteration 3 are cleared in cycle 8, etc.

FIGS. 9E and 9F are similar tables to FIGS. 9C and 9D, respectively, but illustrate double-precision source register locking and clearing in RunFast mode. As mentioned previously, when the number of iterations is two or less, no source registers are locked. Accordingly, as can be seen from FIGS. 9E and 9F, the source registers are only locked when the number of iterations is three or four, and in those instances only the source registers for the third and fourth iterations are locked. The locks on the source registers for the third iteration are cleared when the first iteration is in the E1 stage, and accordingly the locks for the third iteration are cleared in cycle 4. For single cycle throughput vector instructions, the locks on the source registers for iteration 4 are then cleared in the fifth cycle. However, if the vector instruction has two-cycle throughput, and accordingly each iteration spends two cycles in the E1 stage, then the locks for the source registers of iteration 4 are not cleared until cycle 6, this being shown by the right-hand portion of the table of FIG. 9F.

Accordingly, it can be seen that the preferred embodiments of the present invention enable significant improvements in processing speed to be obtained in those environments where full compliance with all aspects of the IEEE 754 standard are not required, by enabling the mode of operation to be switched to a RunFast mode in such instances, this enabling the number of source registers locked to be decreased, thereby reducing the number of instances in which instructions have to be stalled prior to entering the execution pipeline.

Although a particular embodiment of the invention has been described herewith, it will be apparent that the invention is not limited thereto, and that many modifications and additions may be made within the scope of the invention. For example, although the preferred embodiment has been described in relation to a CPU with a physically separate coprocessor, this need not be the case. For example, the floating-point unit may be provided within the main processor. Further, as mentioned earlier, although the coprocessor is shown as having two pipelines in the preferred embodiment, more pipelines may be provided, each responding to a different set of instructions, or providing overlap between sets of instructions. In addition, various combinations of the features of the following dependent claims could be made with the features of the independent claims without departing from the scope of the present invention.

We claim:

1. A data processing apparatus, comprising:
a processing unit comprising a pipeline for executing a sequence of instructions, said processing unit having a first mode of operation and a second mode of operation;
a set of source registers for storing source data required by the processing unit when executing instructions in the sequence;
a locking mechanism for locking source registers dependent on configurable criteria, the configurable criteria being chosen to ensure that source registers still required for completing execution of an instruction in the pipeline are locked to prevent predetermined types of access by a subsequent instruction, the subsequent instruction only being able to enter the pipeline if the source registers relevant to that instruction can be accessed as required by the instruction;
wherein, the first mode of operation, the processing unit, responsive to a determination of at least one exception conditions during execution of an instruction, invoking a process external to the pipelined execution unit to enable execution of the instruction to be completed;
in the second mode of operation, the processing unit completing execution of an instruction within the pipeline even if the presence of said at least one exception conditions is determined; and
wherein the locking mechanism altering the configurable criteria dependent on the mode of operation of the processing unit, such that a reduction in the number of source registers being locked can be achieved in the second mode of operation.

2. A data processing apparatus as claimed in claim 1, further comprising a set of destination registers for storing destination data resulting from execution of the instructions in the sequence, the locking mechanism being further arranged to lock destination registers dependent on predetermined criteria.

3. A data processing apparatus as claimed in claim 2, wherein the predetermined criteria used to determine locking of destination registers is the same for both the first and the second modes of operation.

4. A data processing apparatus as claimed in claim 1, wherein the locking mechanism comprises:
a record of the locked registers;
check logic for determining with reference to the record of locked registers whether the subsequent instruction can enter the pipeline; and
determination logic for determining for the subsequent instruction whether any of the source registers of that instruction should be locked in the record, the determination logic being responsive to the configurable criteria.

5. A data processing apparatus as claimed in claim 1, wherein the configurable criteria is arranged in the first mode of operation such that when an instruction is to be executed by the pipeline, the locking mechanism lock source registers required by that instruction whilst those source registers may still be overwritten before they have been read by that instruction in the pipeline or whilst they may still be required by the process external to the pipeline, whereas in the second mode of operation the configurable criteria is arranged such that the locking mechanism locks source registers required by that instruction only whilst those source registers may still be overwritten before they have been read by that instruction in the pipeline.

6. A data processing apparatus as claimed in claim 5, wherein in the second mode of operation the configurable criteria is arranged such that the locking mechanism does not lock any source registers for scalar instructions or for vector instructions having a number of iterations less than or equal to a predetermined value.

7. A data processing apparatus as claimed in claim 6, wherein said predetermined value is four for single precision vector instructions or for double precision vector instructions with single cycle throughout, and wherein said predetermined value is two for double precision vector instructions with two cycle throughput.

8. A data processing apparatus as claimed in claim 7, wherein the configurable criteria is such that in the second mode of operation the locking mechanism treats any double precision vector instruction as having a two cycle throughput.

9. A data processing apparatus as claimed in claim 1, wherein the process external to the pipeline is either support code or a user-enabled exception handling routine.

10. A data processing apparatus as claimed in claim 1, wherein the first mode of operation is an IEEE 754 compliant mode of operation, and the second mode of operation is a IEEE 754 non-compliant mode which avoids the need for software routines to handle said one or more exception conditions.

11. A data processing apparatus as claimed in claim 2, wherein the locking mechanism comprises a first record for recording the locked destination registers and a second record for recording the locked source registers.

12. A data processing apparatus as claimed in claim 11, wherein, in the second mode, if the subsequent instruction needs to perform any type of access to a destination register indicated as locked in the first record, it will be stalled from entering the pipeline until the lock has been cleared from the first record, whereas if the subsequent instruction only needs to perform a read access of one or more of the source registers locked in the second record, it will be permitted to enter the pipeline without needing to wait for the relevant locks to be cleared from the second record.

13. A data processing apparatus as claimed in claim 1, wherein in the second mode of operation the processing unit is arranged to employ a flush-to-zero mode to replace any source data or result data in the denormal range with a positive zero.

14. A data processing apparatus as claimed in claim 1, wherein in the second mode of operation the processing unit is arranged to employ a default NaN (Not-a-Number) mode to produce as result data a default NaN if any of the source data is a NaN.

15. A data processing apparatus as claimed in claim 1, wherein in the second mode of operation the processing unit is arranged to process within the hardware of the processing unit any overflow, inexact, divide-by-zero or invalid exception conditions.

16. A method of operating a data processing apparatus having a processing unit comprising a pipeline for executing a sequence of instructions, and a set of source registers for storing source data required by the processing unit when executing instructions in the sequence, the method comprising the steps of:

(i) locking source register dependent on configurable criteria, the configurable criteria being chosen to ensure that source registers still required for completing execution of an instruction in the pipeline are locked to prevent predetermined types of access by a subsequent instruction, the subsequent instruction only being able to enter the pipeline if the source registers relevant to that instruction can be accessed as required by the instruction;

(ii) selecting a first or a second mode of operation for the processing unit, wherein, in the first mode of operation, upon determination of at least one exception condition during execution of an instruction, invoking a process external to the pipelined execution unit to enable execution of the instruction to be completed, and, in the second mode of operation, completing execution of an instruction within the pipeline even if the presence of said at least one exception conditions is determined; and (iii) altering the configurable criteria dependent on the mode of operation of the processing unit, such that a reduction in the number of source registers being locked can be achieved in the second mode of operation.

* * * * *